June 24, 1941.  G. J. SELLMEYER  2,247,314
PORTABLE POWER DRIVEN SAW
Filed May 31, 1939  3 Sheets-Sheet 1
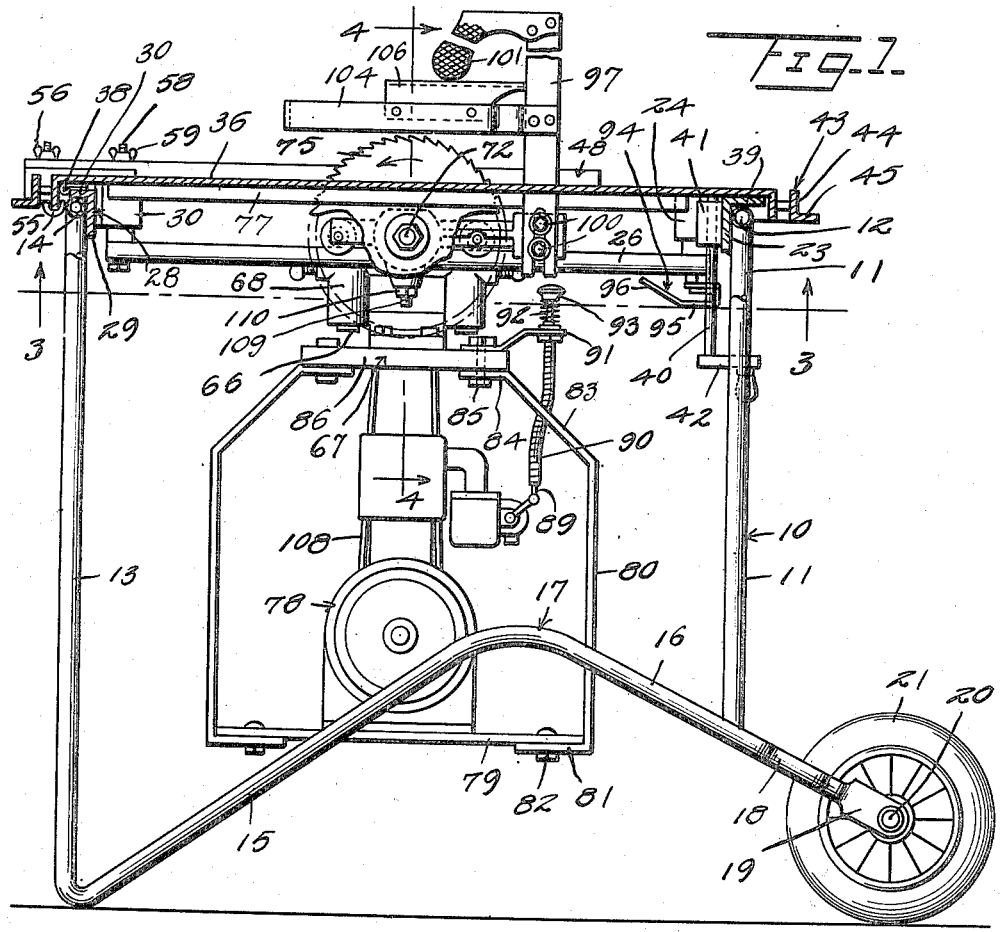
Inventor
G. J. Sellmeyer
By Kimmel & Crowell
Attorneys

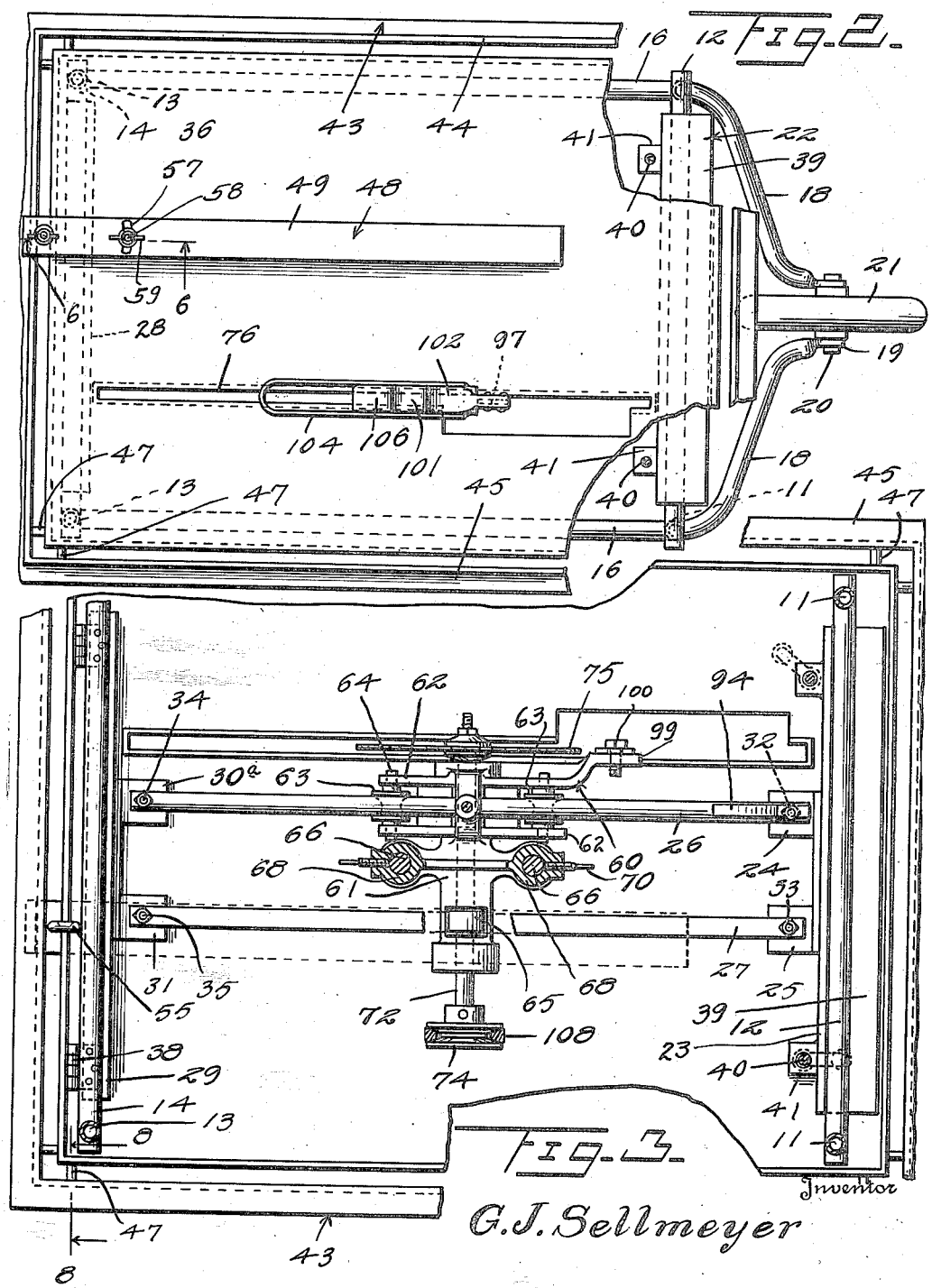

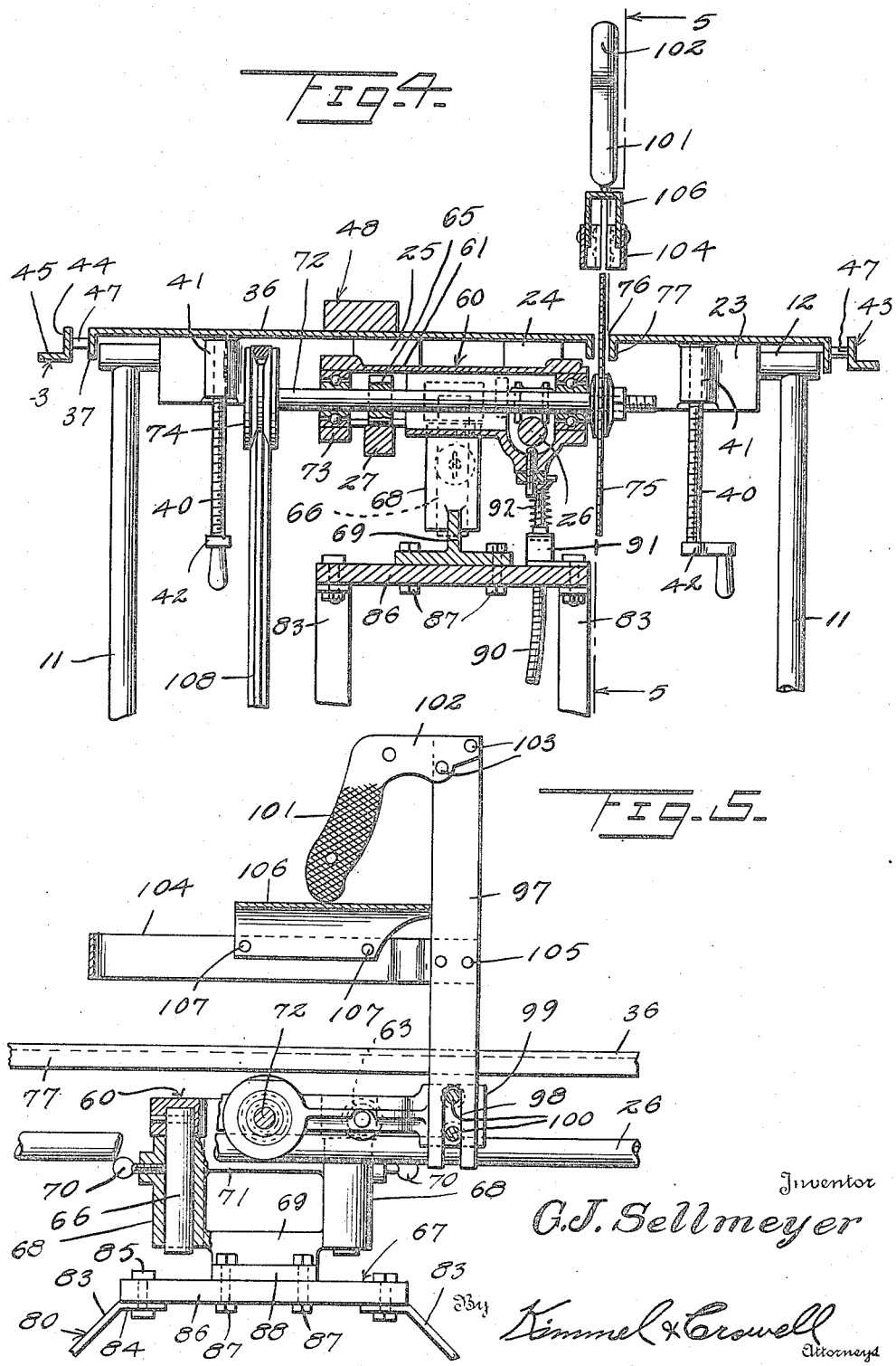

Patented June 24, 1941

2,247,314

UNITED STATES PATENT OFFICE 2,247,314

PORTABLE POWER DRIVEN SAW

Gilbert J. Sellmeyer, Indianapolis, Ind.

Application May 31, 1939, Serial No. 276,688

2 Claims. (Cl. 143—46)

This invention relates to saws and more particularly to a portable power driven saw.

An object of this invention is to provide a portable power driven saw which is so constructed that any operations capable of being performed on a stationary saw structure may be performed on the portable saw structure.

Another object of this invention is to provide a saw structure of this kind wherein the rotating saw is movable relative to a stationary table, the saw being pulled forwardly or backwardly relative to the table so as to perform the desired cutting operations.

A further object of this invention is to provide a saw of this character wherein the rotating saw together with the driving means therefore is movable relative to a stationary table and wherein the speed of the rotating saw is automatically cut down when the saw has completed its cutting operation.

A still further object of this invention is to provide a saw structure of this kind wherein a material guiding bar may be adjusted to any desired point about the entire area of the stationary table and in addition may be angularly adjusted relative to the line of travel of the saw.

A further object of this invention is to provide a saw structure of this kind wherein the saw table is adjustable relative to the rotating saw in order that any desired depth of cut may be made in the material.

A further object of this invention is to provide a saw structure of this kind wherein the rotating saw may be locked against longitudinal movement relative to the table so that the cutting operation may be made in the same manner as ordinary circular saws mounted on a stationary bed.

To the above objects and to others which may hereinafter appear, the invention consists of the novel construction, combination and arrangement of parts as will be more specifically referred to and as illustrated in the accompanying drawings, wherein is illustrated an embodiment of the invention, but it is to be understood that changes, variations and modifications may be resorted to which fall within the scope of the invention as claimed.

In the drawings:

Figure 1 is a detail side elevation partly in section and partly broken away of a saw structure constructed according to an embodiment of this invention, Figure 2 is a plan view partly broken away of the device, Figure 3 is a sectional view taken on the line 3—3 of Figure 1, Figure 4 is a sectional view taken on the line 4—4 of Figure 1, Figure 5 is a sectional view taken on the line 5—5 of Figure 4, Figure 6 is a sectional view taken on the line 6—6 of Figure 2, Figure 7 is a fragmentary bottom plan of the material guiding rail, and Figure 8 is an enlarged fragmentary sectional view taken on the line 8—8 of Figure 3.

Referring to the drawings, the numeral 10 designates generally a portable frame structure comprising a pair of upright tubular end posts 11 connected together at their upper ends by a horizontally and transversely disposed connecting member 12. A pair of rear upright posts 13 are connected together at their upper ends by a rear transverse tubular member 14. A V-shaped lower frame member is connected at one side 15 thereof to the lower end of a post or upright member 13 and in the present instance, is formed integrally with a post 13. The other side 16 of the V-shaped member 17 is secured as by welding or the like to the lower end of a post 11 and preferably, this forward side 16 of the V member 17 is shorter in length than the side 15. Each forward side 16 is continued forwardly of the post 11 and then bent inwardly as at 18. The terminal end of each extension 18 is provided with a flat bearing or fork portion 19 through which a wheel shaft 20 engages. A wheel 21 is rotatable on the shaft 20 and provides a means whereby when the rear end of the frame 10 is raised the entire frame may be readily moved to the desired location.

The forward frame bar 12 has secured thereto an angle bar 22 which has a vertical side 23 on the inner side of the frame 10. The vertical side of the angle bar 22 is provided with a pair of spaced apart blocks 24 and 25 and a pair of saw guide members 26 and 27 are secured at one end to the blocks 24 and 25 respectively. These guide members 26 and 27 are disposed in horizontal and parallel relation. The frame bar 14 has secured thereto as by welding or the like an angle member 28 comprising a vertical side member 29 and a horizontal side member 30. The vertical side member 29 has secured thereto a pair of blocks 30a and 31 which have secured thereto the opposite ends of the guide members 26 and 27. The guide members 26 and 27 are secured as by fastening devices 32 and 33 to the blocks 24 and 25 respectively and the opposite ends of the guide members 26 and 27 are secured as by fastening members 34 and 35 respectively to the blocks 30a and 31.

A material supporting table comprising a flat sheet 36 is disposed on top of the frame 10 and this flat sheet 36 is provided about the marginal edges thereof with a depending flange 37 which extends about the area of the frame 10 as shown in Figures 1, 2, 3 and 4. The table 36 is hingedly secured to the rear end of the frame 10 by a hinge means 38 and the opposite end of the table 36 when in horizontal position is adapted to engage the upper surface of the horizontal side 39 of the angle member 22. The free end of the table 36 may be adjusted vertically relative to the frame 10 by means of a pair of threaded shafts or screws 40 which are threaded through blocks or fixed nuts 41 carried by the vertical side 23 of the angle member 22. A handle or crank 42 is fixed to the lower end of each shaft 40 and provides a means whereby the forward end of the table 36 may be raised or lowered.

The table 36 about the marginal edges thereof is provided with a rectangular guide frame 43 which is formed of angle members connected together at their ends with one side 44 of each angle member disposed in outwardly spaced relation to the flange 37 and parallel therewith. The other side 45 of the guide frame angle members is disposed in a horizontal position and extends outwardly of the table 36 and provides a means whereby extensions in the form of boards or the like may be secured to the guide frame 43 with the upper surfaces of the boards substantially flush or coplanar with the upper surface of the table 36. In this manner substantially long boards may be engaged with the table 36 so as to perform the desired cutting thereof. The frame 43 is held in a fixed position relative to the table 36 by means of securing members 46 (Figure 8) which engage the flange 37 and the vertical sides 44. Tubular spacing members 47 engage about the fastening members 46 so as to hold the frame member 43 in desired outwardly spaced relation to the table 36.

A material guiding board or rail 48 is adapted to be adjustably mounted on top of the table 36 and comprises an elongated member 49 (Figure 2) provided at its outer end with a recess 50 (Figure 6) within which a plate 51 engages. The plate 51 is provided with a pair of downwardly extending parallel flanges 52 and 53 between which the vertical side 44 of the guide frame 43 is adapted to engage. The flange 52 engages between the vertical side 44 and the depending flange 37 and coacts with the flange 53 in holding the plate 51 at right angles to the adjacent edge of the table 36. The guide member 48 is secured in adjusted position relative to the table 36 by means of a thread bolt 54 provided with a hook end portion 55 engaging about the lower edge of the flange 37. A thumb nut 56 is threaded onto the opposite end of the bolt 54 and tightly holds the guide member 48 in adjusted position. In addition to holding the guide member 48 in adjusted position, the bolt 54 provides a pivot means through which the angular relation of the guide member 48 may be varied relative to the line of travel of the saw structure to be hereinafter described.

The guide member 48 at a point inwardly of the outer end thereof is provided with an arcuate slot or opening 57 (Figure 2) through which a clamping bolt 58 engages. The clamping bolt 58 is threaded through the plate 51 and a thumb nut 59 is threaded onto the bolt 58. Loosening of the nut 59 will permit swinging movement of the guide member 48 with the bolt 54 as a pivot.

A saw supporting member or carriage generally designated as 60 (Figure 4) is disposed below the table 36 and comprises a frame 61 having pairs of spaced apart ears 62 (Figure 3) between each pair of which a roller 63 engages, the roller 63 being mounted on a shaft or pin 64. The rollers 63 are provided with grooved peripheral surfaces for engagement with the round guide member 26. A roller 65 is rotatably carried with the frame 61 and engages the squared or flat guide bar 27. The frame 61 has secured thereto a pair of depending studs or rods 66 with which a removable motor frame structure 67 (Figure 5) is adapted to engage. The motor frame structure 67 includes a pair of sleeve members 68 secured to a plate 69 and the sleeve members 68 may be secured in adjusted position to the studs 66 by set screws 70. The sleeves 68 may be connected together adjacent their upper ends by a connecting web 71 which may be formed integrally with the sleeve 68. Preferably, the plate or web member 69 is also formed integrally with the sleeves 68.

A saw arbor or shaft 72 is journalled in bearings 73 (Figure 4) carried by the frame 60 and has revolubly mounted thereon the roller 65. One end of the arbor or shaft 62 has a grooved pulley 74 secured thereto. The other end of the shaft or arbor 72 is threaded and a disc saw 75 is removably mounted on the threaded end of the arbor 72. The table 36 is provided with an elongated slot 76 through which the saw 75 is adapted to project and preferably, the table 36 is provided with depending flanges 77 extending downwardly from the saw slot 76. The latter has a wide terminal portion to permit of removing the saw 75 from the arbor 72 when desired.

A power member 78 (Figure 1) in the form of an internal combustion engine is mounted on a platform 79 which is supported by depending frame bars 80 having inwardly projecting lower end portions 81 secured as by fastening members 82 to the platform 79. The upper portions of the bars 80 are inclined inwardly as at 83 and then bent in a horizontal position as at 84 for securing as by fastening members 85 to a top plate 86. The plate 86 is secured as by bolts 87 to a flange or plate 88 carried by the frame member 60 (Figure 5).

The motor frame hereinbefore described is adapted to be suspended between the lower V frame members 17 and may move horizontally back and forth by movement of the saw supporting frame 60 on the guide members 26 and 27.

In order to provide a means whereby the engine 78 may have the speed thereof automatically reduced to an idling speed, I have provided a Bowden wire 89 (Figure 1) which is slidable in the sheath 90 supported by a supporting member 91 fixed to the plate 86 by one of the fastening members 85. The throttle controlling wire 86 is urged to an uppermost position by means of a spring 92 which at its lower end engages the guide member 91 and at its upper end engages a head 93 fixed to the wire 89. Normally the spring 92 is adapted to hold the throttle open in order to have the engine 78 rotate at a full or saw cutting speed. When the carriage or frame 60 is moved along the guide members 26 and 27 to the forward end of the table 36 at which point the cutting operation begins, the speed of the engine 78 is automatically reduced by means of a cam member 94 which is fixed to the fastening member 32. This cam member 94 is constructed in the form of a U-shaped member 95 having one side thereof secured to the bolt 32 and the other side projecting downwardly therefrom. An upwardly inclined throttle engaging element 96 is formed integral with the lower side of the U-shaped member 95 and is adapted upon engagement of the head 93 therewith to move the throttle controlling member 89 downwardly to operate the engine 78 at an idling speed.

In order to provide a means whereby the operator of this device may be protected from the rotating saw 75 and also to provide a means whereby the carriage 60 may be moved longitudinally of the slot 76, I have provided a vertically disposed bar 97 provided at its lower end with an elongated slot 98 (Figure 5). The carriage 60 is provided with an ear or extension 99 through which a pair of bolts 100 engage. The bolts 100 engage through the slot 98 and hold the bar 97 in vertically adjusted position. The bar 97 at its upper end is provided with a handle 101 having an extension 102 secured as by fastening members 103 to the upper end of the bar 97. A looped guard member 104 is secured as by fastening members 105 to the bar 97 at a point above the table 36 and below the handle 101. The looped member 104 is open at the upper and lower sides thereof and a U-shaped shield or guard member 106 is secured as by fastening members 107 to the looped member 104 and is disposed below the handle 101 so that the operator of the device will not be able to contact with the rotating saw which is positioned within the looped member 104.

In the use and operation of this device, the power member 78 is set in operation and when the carriage 60 and the motor frame 80 are at the forward end of the slot 76, the throttle controlling button 93 will be depressed by the cam member 94 so that the motor or internal combustion engine 78 will be operating at an idling speed. The guide member 48 is adjusted by means of the adjusting bolt 54 so as to position the guide member 48 in the desired relation with respect to the saw 75. The angular relation of the guide member 48 may be adjusted through the adjusting bolt 58 and the nut 59. The material is then placed on the table 36 forwardly of the saw 75. The handle 101 may then be grasped and the saw carriage with the engine 78 may be positioned at the end of the slot 76. The saw 75 may be pulled towards the person, the carriage moving forwardly on the guide members 26 and 27. After the desired cut has been made in the material, the saw carriage may be returned to the rear end of the frame whereupon the cam member 94 will again engage the throttle controlling member 93 so as to move the throttle to an idling position.

It will be understood that when the carriage 60 is pulled forwardly the engine 78 will speed up and that a slight pause may be necesary in the movement of the carriage 60 so as to permit the saw 75 to rotate at the desired speed before initially contacting with the material. The engine 78 is provided with a grooved pulley similar to the pulley 74 and a flexible belt 108 engages the driving pulley carried by the engine 78 and the driven pulley 74 mounted on the arbor 72.

The table 36 may be maintained in a horizontal position by lowering the elevating screws 40 so that the rear end of the table 36 will rest on the angle member 22. However, if it is desired to make a small groove in the material to form a rabbet or for other purposes, the rear end of the table 36 may be raised by the elevating screws 40 so that the saw 75 will project the desired distance through the slot 76 and above the table 36. Where this is done, the saw carriage may be locked against movement relative to the guide members 26 and 27 by means of a set screw 109 which may be locked by a nut 110. The set screw 109 is adapted to engage the under side of the guide member 26. Where it is considered necessary or desirable, the handle 101 with the bar 97 and the guide means 104 and 106 may be removed by loosening the bolts 100 and pulling the bar 97 upwardly. It will be understood that the vertical position of the guard means 104 and 106 may be adjusted to the desired degree by means of the bolts 100.

The vertical bar 97 while supporting the handle 101 and the saw guard 104—106 also constitutes a wood splitting means rearwardly of the saw 75 which will prevent the wood from pinching together after the cut has been made and thus binding the saw.

A saw constructed according to this invention may be transported from one point to another by raising the forward end of the frame 10 and moving the entire structure by means of the wheel 21. When the saw is in use, the legs 13 will hold the frame 10 against undue movement. While I have shown an internal combustion engine 78 mounted on the under side of the saw carriage 60, it will be understood that if desired an electric motor may be substituted for the internal combustion engine 78. However, with the use of an internal combustion engine, the saw structure may be used during the initial construction of a building at which time it frequently happens that no electricity is available for use with electrical appliances. In this manner the motor operating saw which is operated by the internal combustion engine will be more preferable particularly as the entire saw structure may be transported to any desired point.

What I claim is:

1. A portable saw structure comprising a portable frame, a table carried by said frame and having an elongated saw slot therein, guide bars disposed beneath said table, a horizontally bodily shiftable reciprocal saw carriage, rollers connected with said carriage and travelling on said bars, a carriage operator fixed to said carriage and extending upwardly through said saw slot, a horizontally disposed U-shaped bar spaced above said table and having the ends of the legs thereof fixed to opposite sides of said operator, and a horizontally disposed inverted channel-shaped guard plate having parallel sides fixed at their lower ends to the parallel legs of said bar and extended above the latter.

2. A portable saw structure comprising a portable frame, a table carried by the frame having an elongated saw slot therein, a pair of spaced parallel guide bars arranged below the table inwardly of the inner side of said slot, a horizontally shiftable carriage arranged below said table, a driven saw arbor journaled in and extended from the carriage, a rotatable saw on one end of said arbor operating in said slot, a pair of spaced parallel supporting rollers for and connected to said carriage travelling on one of said guide bars, another supporting roller for the carriage, disposed in a line passing between the rollers of said pair and extending through the carriage, and the said other roller travelling on the other one of said guide bars and being revolubly mounted on said arbor.

GILBERT J. SELLMEYER.